United States Patent [19]
Huber et al.

[11] Patent Number: 5,163,584
[45] Date of Patent: Nov. 17, 1992

[54] METHOD AND APPARATUS FOR MIXING AND DISPENSING FOAM WITH INJECTED LOW PRESSURE GAS

[75] Inventors: E. Richard Huber, Houston; Pat L. Murray, Spring, both of Tex.

[73] Assignee: Polyfoam Products, Inc., Houston, Tex.

[21] Appl. No.: 629,483

[22] Filed: Dec. 18, 1990

[51] Int. Cl.⁵ ............................................. B67D 5/60
[52] U.S. Cl. ...................................... 222/1; 222/145; 222/148; 222/195; 222/389; 239/112; 239/116; 239/412; 239/414; 239/427.5
[58] Field of Search ................... 222/1, 145, 148, 389, 222/195; 239/112, 113, 114, 115, 116, 320, 412, 414, 416.1, 427.5, 428

[56] References Cited

U.S. PATENT DOCUMENTS

| | | | |
|---|---|---|---|
| 3,240,432 | 3/1966 | Boettler | 239/124 |
| 3,263,928 | 8/1966 | Gusmer | 239/123 |
| 3,291,396 | 12/1966 | Walter | 239/412 |
| 3,417,923 | 12/1968 | Carlson | 239/112 |
| 3,633,795 | 1/1972 | Brooks | 222/134 |
| 3,687,370 | 8/1972 | Sperry | 239/112 |
| 3,786,990 | 1/1974 | Hagfors | 239/112 |
| 3,873,023 | 3/1975 | Moss et al. | 239/3 |
| 3,876,145 | 4/1975 | Gusmer et al. | 239/112 |
| 3,941,355 | 3/1976 | Simpson | 222/145 X |
| 3,945,569 | 3/1976 | Sperry | 239/112 |
| 4,023,733 | 5/1977 | Sperry | 239/112 |
| 4,262,847 | 4/1981 | Stitzer et al. | 239/112 |
| 4,262,848 | 4/1981 | Chabria | 239/112 |
| 4,263,166 | 4/1981 | Adams | 252/359 E |
| 4,285,446 | 8/1981 | Rapp et al. | 222/70 |
| 4,325,513 | 4/1982 | Smith et al. | 239/112 |
| 4,377,256 | 3/1983 | Commette et al. | 239/117 |
| 4,399,930 | 8/1983 | Harding | 222/145 |
| 4,440,320 | 4/1984 | Wernicke | 222/145 |
| 4,469,251 | 9/1984 | Sperry et al. | 222/135 |
| 4,471,887 | 9/1984 | Decker | 222/145 X |
| 4,534,802 | 8/1985 | Gates | 134/22.12 |
| 4,568,003 | 2/1986 | Sperry et al. | 222/145 |
| 4,913,317 | 4/1990 | Wernicke | 222/1 |
| 4,993,596 | 2/1991 | Brown | 222/145 |
| 5,040,728 | 8/1991 | Zwirlein et al. | 239/116 |

OTHER PUBLICATIONS

Sealed Air Corp. Brochure 1982.
Foamtek, Inc. Brochure, "E-Z Froth SF Urethane Foam Dispensing Machine," Aug. 1989, pp. 1-2.
Flexible Products Co. Brochure, "Flexible Products Company," undated, pp. 4, 8-10.

*Primary Examiner*—Andres Kashnikow
*Assistant Examiner*—Joseph A. Kaufman
*Attorney, Agent, or Firm*—Pravel, Gambrell, Hewitt, Kimball & Krieger

[57] ABSTRACT

A foam dispensing system and apparatus for mixing a plurality of foam components into an expanded foam and dispensing the mixed foam components, the apparatus having a body portion and a cartridge assembly mounted on said body portion. The cartridge assembly includes a mix chamber having a longitudinal bore and an aftermix chamber in communication with the mix chamber. The apparatus further includes inlets and passageway for supplying the plurality of foam components to the longitudinal bore of the mix chamber and a slidable valve rod for controlling the flow of the plurality of foam components into the mix chamber. A pressurized gas is injected into the aftermix chamber to aid in the mixing of the plurality of foam components and to provide an improved spray pattern of foam.

12 Claims, 3 Drawing Sheets

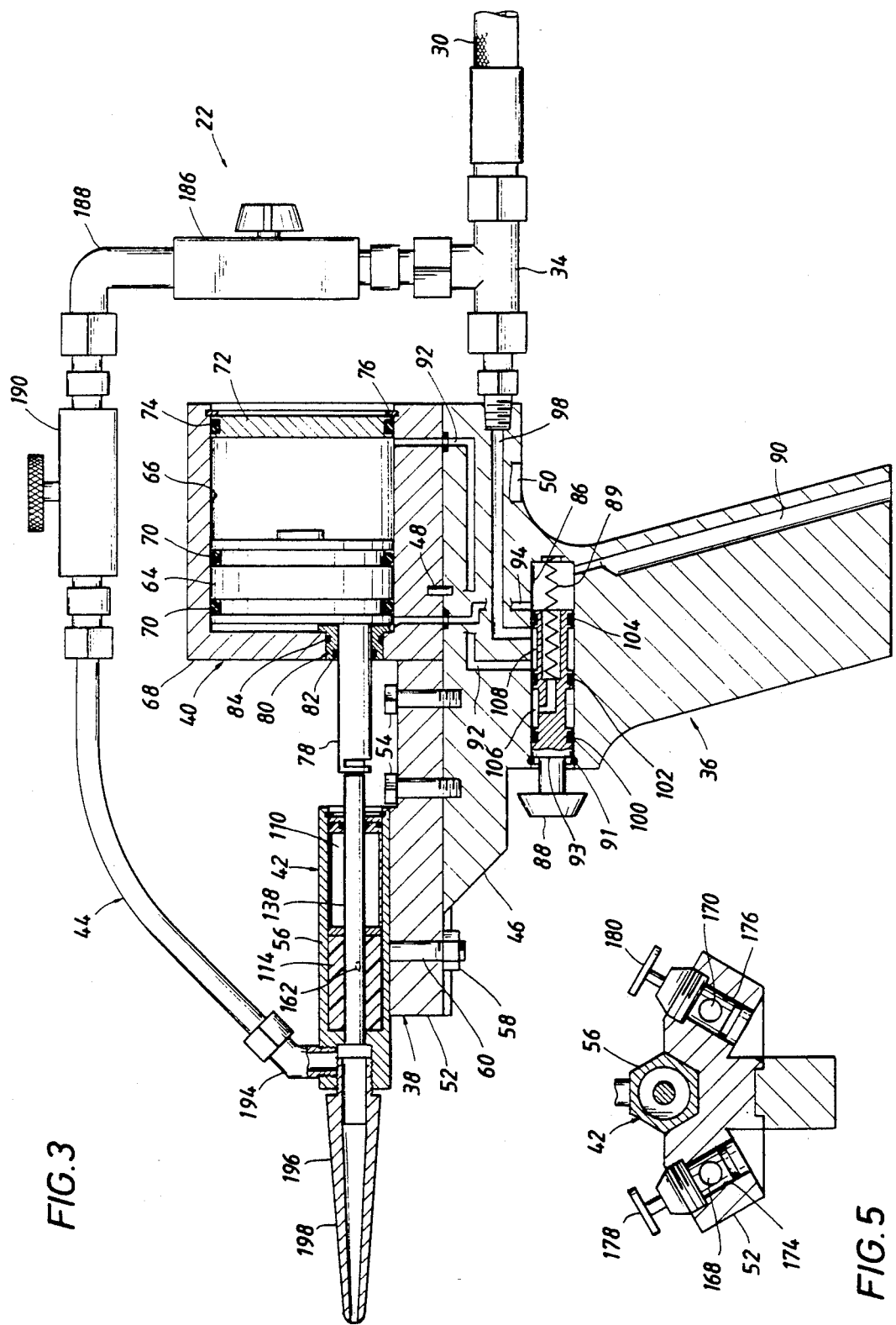

METHOD AND APPARATUS FOR MIXING AND DISPENSING FOAM WITH INJECTED LOW PRESSURE GAS

BACKGROUND OF THE INVENTION

1. Field of the Invention

The present invention relates to an apparatus for the mixing and dispensing of expanding foams and, more particularly, to an improved foam dispensing gun and system having improved spray characteristics and methods for the same.

2. Description of the Related Art

Various foam dispensing devices or guns have been proposed and used for the mixing and dispensing of expanding synthetic foams, such as polyurethane or polyisocyanurate foams. The preparation of many expanding synthetic foams requires uniform mixing of two fluid components, liquid organic resins with polyisocyanates, in a mixing chamber. When these two components are mixed in proper proportions, they typically react quickly to form and solidify into an expanded foam. Foam dispensing guns must, therefore, be kept free from buildup of the foam components and resulting expanded foam, so that control valves and passageways do not become clogged, rendering the foam dispensing gun inoperable.

Certain prior foam dispensing guns required dismantling after each application in order to clean the dispenser. More recently, most foam dispensing guns have utilized integral means for cleaning purposes, with a solvent being introduced to the foam dispensing gun after each use to flush the expanded foam and unreacted foam components therefrom. However, experience with foam dispensing guns of this general nature has shown that adequate cleaning is not always provided. Thus, frequent disassembly of the foam dispensing gun to remove the residue foam is still required which reduces the efficiency of the foam installation operation. Furthermore, foam dispensing guns of this type introduce additional problems of toxicity and disposal of the solvent.

There are two types of foam dispensing guns: "pour" guns and spray guns. Pour guns are used for various applications which include packaging objects for shipping, cavity fill for floatation and/or cavity fill for insulation. A pour gun, as the name suggests, simply pours the mixed foam into a desired cavity to accomplish the necessary application. Typically, the steps involved in packaging an object consists of initially directing a "shot" of the mixed foam into the bottom of the container, inserting a polyethylene sheet over the top of the shot of mixed foam, placing the object to be shipped in the container, placing another sheet of polyethylene on top of the object, and then dispensing more mixed foam to fill the container with the cushioning foam. A delay of 10-20 seconds from the time the first shot is dispensed to the time the second shot is dispensed allows the accumulation of foam to harden and possibly clog the foam dispensing gun. Thus, pour guns must be suitably adapted to handle frequent shots of mixing foam of brief duration without clogging.

Spray guns are used to apply polyurethane foam as insulation to walls of vessels or various components. The spray gun is used to emit a continuous, uniform spray of foam over a given surface. Thus, the spray gun must be suitably adapted to emit the spray of foam from the foam dispensing gun for extended periods of time without interruption. Also, depending on the foam application, the foam dispensing gun should be capable of dispensing a quality foam spray over a range of spraying distances.

Due to the varied uses of foam dispensing guns, it may be necessary to apply polyurethane foam or polyisocyanurate foam over large areas covering considerable distances. It is desirable to be able to apply the foam with a minimum of interruptions without the need to frequently move the entire foam dispensing system while keeping the system simple to maintain and inexpensive to operate.

It is desirable to be able to vary the ratio of the two components forming the foam to accomplish solidified foam having desired physical properties.

It is also desirable to be able to adjust the "fineness" of the spray pattern of the foam without adjusting the pressure of the foam components supplied to the foam dispensing gun.

Another problem with certain prior foam dispensing guns is that the nozzle through which the mixed foam exits the gun clogs after the pouring or spraying ceases. Thus, the nozzles, typically made from plastic, need to be replaced after each usage. This is both time consuming and costly. It is desired to have a foam dispensing gun which cleans and removes mixed foam from the nozzle during and after each use.

Many foam dispensing guns require the foam components to be under high pressure, on the order of 800-1200 pounds per square inch, during the spraying operation. The high pressure of the foam components mixes the foam components and propels the mixed foam from the foam dispensing gun in a finely atomized mist. The high pressure is augmented by heating the hoses which deliver the components to the foam dispensing gun. The heat added to the components improves the mixing of the foam components and the resulting volume of produced foam. However, the high operating pressures and heat requirement adds to the cost and maintenance of the foam dispensing system. It is desirable to have a foam dispensing gun which operates at low pressures without the need of heating the hoses.

SUMMARY OF THE INVENTION

The present invention relates to apparatus for the mixing and dispensing of expanding foams. The foam dispensing apparatus or gun is adapted to be used with resin systems in which two or more fluid components, separately stored in vessels, are mixed in a mixing chamber of the foam dispensing gun and dispensed as settable foam. The present invention can be used to either pour or spray the foam by altering the type of nozzle attached to the foam dispensing gun and by adjusting the amount of injected pressurized gas used to emit the foam from the foam dispensing gun.

A foam dispensing gun in one embodiment according to the present invention includes a pressure-actuated piston and cylinder assembly which extends and retracts a valve rod in the mixing chamber. The valve rod controls the entrance of the foam components into the mixing chamber. Primary mixing of the foam components occurs in the mixing chamber. The foam dispensing gun injects pressurized gas or air at a point just beyond the mixing chamber in an aftermix chamber. The injected pressurized gas in the aftermix chamber provides additional mixing of the foam and also propels the foam, resulting in an improved spray pattern. The "fineness" of the spray pattern can be altered by adjusting the amount of injected pressurized gas into the aftermix chamber. The injected pressurized gas also flushes the foam during and after every use from the aftermix chamber and the nozzle attached to the aftermix chamber, thus, eliminating the need of replacing or cleaning the nozzle after each use. The valve rod cleans the foam and foam components from the mixing chamber.

The amount of pressurized gas injected into the aftermix chamber is regulated to control the "fineness" of the foam cell structure and spray pattern emitted through the nozzle. The injected pressurized gas also significantly reduces the required temperature and pressure of the foam components to the dispensing gun.

A foam dispensing system in one embodiment according to the present invention includes the foam dispensing gun, foam component vessels, a source to provide pressurized gas to the foam dispensing gun, and heated or unheated hoses connecting the various system components. The system is inexpensive, simple and requires little maintenance. In such systems, the operating pressures of the foam components and the injected pressurized gas are much lower than certain prior foam dispensing guns making apparatus according to the present invention less costly to operate and maintain.

BRIEF DESCRIPTION OF THE DRAWINGS

A better understanding of the invention can be had when the following detailed description of the preferred embodiment is considered in conjunction with the following drawings, in which:

FIG. 3 is a cross-sectional elevation view of the foam dispensing gun showing the foam dispensing gun in an inoperative position for discharging a fluid foam therefrom;

FIG. 5 is a cross-sectional view taken along line 5—5 of FIG. 2 showing the carrier valve units of the foam dispensing gun;

DETAILED DESCRIPTION OF THE INVENTION

Figure 1:
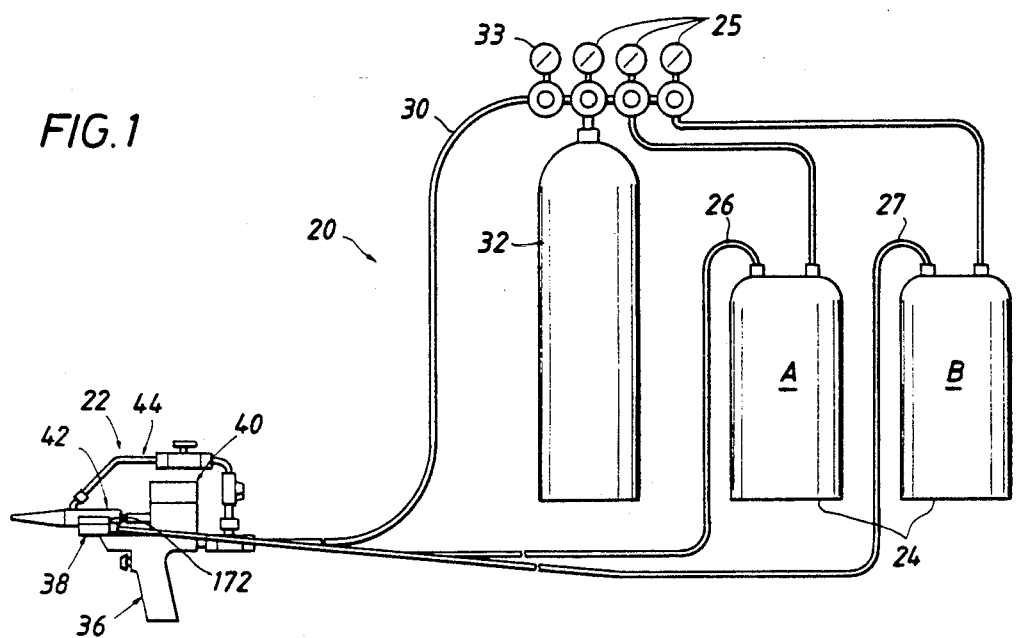
FIG. 1 is a perspective view of a foam dispensing system, including a foam dispensing gun according to a preferred embodiment of the present invention.

FIG. 1 illustrates a foam dispensing system 20 comprising a foam dispensing apparatus or gun 22 for the mixing and dispensing of chemical reactants in forming a polyurethane or polyisocyanurate foam. The foam dispensing system 20 also includes vessels 24 for separately storing the chemical reactants for the polyurethane foam and a source 32 connected to the vessels 24 for transferring the chemical reactants in the vessels 24 to the foam dispensing gun 22. As shown in FIG. 1, the source 32 is a pressurized source, typically a tank of pressurized nitrogen having regulating valves 25 mounted thereto. Alternatively, the source may consist of a pump assembly (not shown) which pumps the chemical components from the vessels 24 to the foam dispensing gun 22.

The chemical reactants for the polyurethane foam are a liquid organic resin designated as component A and a polyisocyanate designated as component B. Components A and B are each supplied to the dispensing gun 22 through suitable hoses or feed lines 26. Components A and B are first mixed within a detachable mixing chamber 28, secured to the dispensing gun 22, to form the polyurethane or polyisocyanurate foam which is discharged from the mixing chamber 28 into an aftermix chamber 29.

A supply hose 30 supplies compressed air or other gas from a source 32 to the dispensing gun 22 through a suitable regulating valve 33 by interconnection of the supply hose 30 to a pipe tee 34. The pipe tee 34 is removably secured to a handle assembly 36 of the foam dispensing gun 22, which will be further explained below. The feed lines 26, 27 supply components A and B to a carrier assembly 38 of the dispensing gun 22. Feed line 26 connects dispensing gun 22 to vessel 24 containing, for example, component A. Feed line 27 connects dispensing gun 22 to vessel 24 containing, for example, component B.

The foam dispensing gun 22 for mixing and dispensing two liquids, such as a liquid organic resin and a liquid polyisocyanate, which react to form a polyurethane foam, will now be described initially with reference to FIGS. 2 and 3. The dispensing gun 22 includes a handle assembly 36, an air cylinder assembly 40, a carrier assembly 38, a cartridge assembly 42 and a gas injection assembly 44. The primary components of the foam dispensing gun 22 are fabricated from any suitable wear resistant material that is chemically inert with respect to components to be mixed and to the plural component material which results from the components being mixed. Suitable materials include aluminum, aluminum alloys, steel and copper alloys, or plastics such as acetal resin, epoxy, glass-filled epoxy, nylon and glass-filled nylon.

Figures 2, 4:
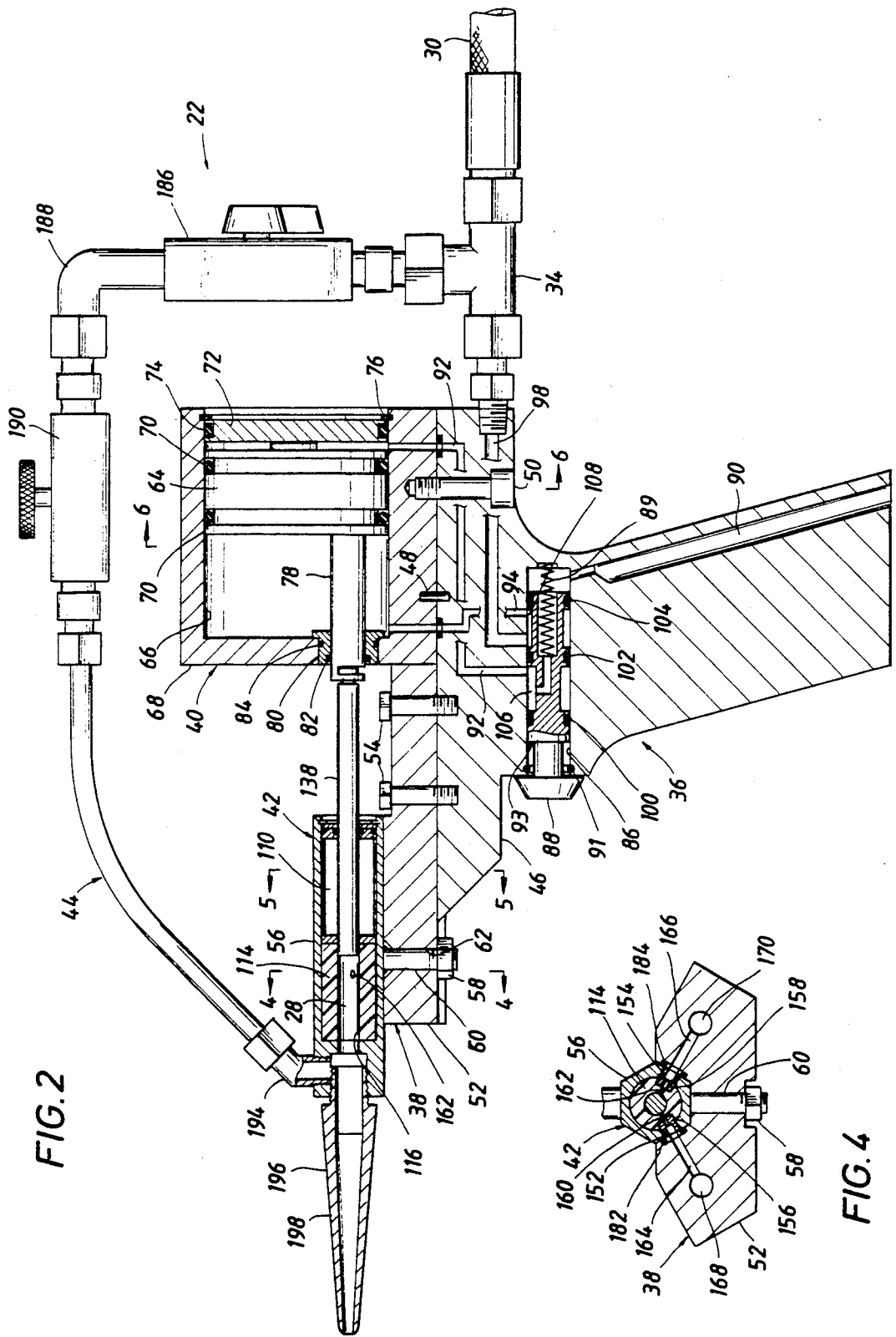
FIG. 2 is a cross-sectional elevation view of the foam dispensing gun showing the foam dispensing gun in an operative position for discharging a fluid foam therefrom.
FIG. 4 is a cross-sectional view taken along line 4—4 of FIG. 2 showing the connection of the cartridge to the carrier body of the foam dispensing gun.

Referring to FIGS. 2 and 3, the internal construction of the foam dispensing gun 22 will now be described in detail. The air cylinder assembly 40 is secured to the top of a handle body 46 of the handle assembly 36 by an alignment pin 48 and a threaded fastener 50 as, for example, a thumb screw. Similarly, a carrier body 52 is secured to the top of the handle body 46 by a pair of threaded fasteners 54. A cartridge body 56 is removably secured to the top of the carrier body 52 by the engagement of a nut 58 as, for example, a thumb nut, with a threaded rod 60 firmly attached to the cartridge body 56 and extending through an opening 62 in the carrier body 52.

Figure 6:
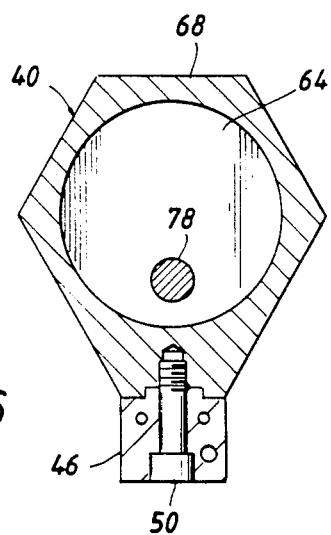
FIG. 6 is a cross-sectional view taken along line 6—6 of FIG. 2 showing the air cylinder assembly on the handle body of the foam dispensing gun.

Referring to FIGS. 2, 3 and 6, the air cylinder assembly 40 includes a sliding piston 64 slidably positioned within a bore 66 of a cylinder body 68. The sliding piston 64 includes a pair of piston O-rings 70 which circumscribe the sliding piston 64 to form a seal between the sliding piston 64 and the cylinder bore 66. A rear end of the cylinder body 68 is sealed with a back plate 72, having an O-ring 74 circumscribing the back plate 72 to form a seal between the back plate 72 and the cylinder bore 66. The back plate 72 is retained within the cylinder body 68 via a back plate retaining clip 76. The sliding piston 64 is pneumatically driven within the cylinder body 68 and controls the movement of a piston rod 78 which is firmly secured to the sliding piston 64. The piston rod 78 extends through a bushing 80 provided at the forward end of the cylinder body 68. The bushing 80 includes an inner bushing O-ring 82 to provide a sliding seal for the piston rod 78. An outer bushing O-ring 84 provides a seal between the bushing 80 and the cylinder body 68.

The handle assembly 36 will now be described in detail. The handle assembly 36 includes a trigger bore 86 which receives a trigger 88. The trigger 88 is biased outwardly by a bias spring 89 positioned at the rear of the trigger 88 between the trigger 88 and the end of the trigger bore 86. The trigger 88 is retained within the trigger bore 86 by a trigger retainer ring 91 which is partially recessed within the handle body 46. The trigger retainer ring 91 abuts a retaining face 93 of the trigger 88 when the trigger 88 is in the outwardly extended position as shown in FIG. 3.

The trigger bore 86 communicates with the surrounding atmosphere by a channel 90 formed in the lower portion of the handle body 46. The trigger bore 86 is further provided in communication with the interior of the cylinder bore 66 by a first passageway 92 and a second passageway 94. The first and second passageways 92, 94 are formed within the handle body 46 and the cylinder body 68. O-ring seals 96 are provided at the interfaces of the first and second passageways 92, 94 between the handle body 46 and the cylinder body 68. The first and second passageways 92, 94 are maintained in aligned relationship between the cylinder body 68 and the handle body 46 by the alignment pin 48 and a notch and groove connection, as shown in FIG. 6.

An air supply passageway 98 provides communication with a source of pressurized air or gas 32 entering the dispensing gun 22 at the rear of the handle body 46 and communicating with the cylinder bore 86. Three O-ring seals 100, 102, and 104 are provided on the trigger 88 to divide the trigger bore 86 into a left compartment 106 and a right compartment 108.

The construction of the detachable cartridge assembly 42 will now be described generally with reference to FIGS. 2, 3, 4 and 7. Specifically referring to FIG. 7, the cartridge assembly 42 includes the cartridge body 56 which includes a reservoir 110, a mix chamber 28, and aftermix chamber 29. The cartridge body 56 is formed of stainless steel or other such suitable metal material which will not be chemically attacked by the organic resin, polyisocyanate, or polyurethane foam, in addition to withstanding the mechanical stresses imparted to the cartridge body 56 during operation of the dispensing gun 22. The cartridge body 56 has a longitudinal cavity 112 for receiving a core 114 of Teflon TM material or other such suitable material. The core 114 includes a longitudinal bore 116 extending therethrough. The core 114 is confined within the longitudinal cavity 112 by a wall 118 of the cartridge body 56 which partitions the longitudinal cavity 112 from the aftermix chamber 29. The wall 118 includes a central hole 120 in coaxial alignment with the longitudinal bore 116 of the core 114. The opposing end of the core 114 is confined within the longitudinal cavity 112 by a washer plate 122 having a central hole 124 in coaxial alignment with the longitudinal bore 116 of the core 114. The washer plate 122 is maintained in position by a spacer sleeve 126 which is inserted in the longitudinal cavity 112 of the cartridge body 56. The spacer sleeve 126 is a hollow sleeve which fits snugly within the longitudinal cavity 112. A leading edge 128 of the spacer sleeve 126 maintains contact with the washer plate 122. A trailing edge 130 of the spacer sleeve 126 maintains contact with an O-ring spacer 132. The O-ring spacer 132 includes an inner spacer O-ring 134 and an outer spacer O-ring 136. The outer spacer O-ring 136 forms a seal between the O-ring spacer 132 and the cartridge body 56. The inner spacer O-ring 134 forms a sliding seal with a valve rod 138. An O-ring retainer 140 abuts the O-ring spacer 132 and inner and outer spacer rings 134, 136. A retaining clip 142 retains the cartridge assembly 42 components within the longitudinal cavity 112 of the cartridge body 56.

Figure 7:
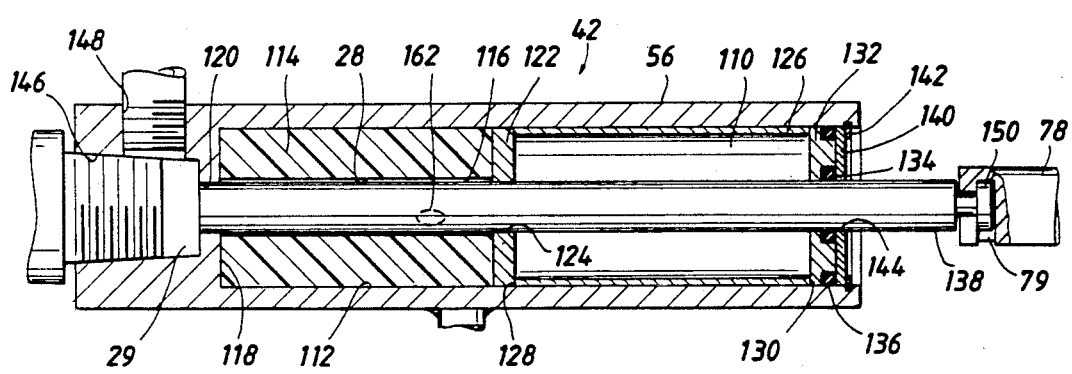
FIG. 7 is a cross-sectional elevation view of the cartridge assembly of the foam dispensing gun.

Referring to FIG. 7, the O-ring retainer 140 has a central hole 144 arranged in coaxial alignment with the central hole 124 of the washer plate 122 and the longitudinal bore 116 of the core 114. The reservoir 110 is formed within the spacer sleeve 126 and end walls comprising the washer plate 122 and the O-ring spacer 132. The reservoir 110 is filled with a lubricant, such as silicone, to permit the valve rod 138 to freely travel in the longitudinal direction, as will be further explained below.

The aftermix chamber 29 includes a threaded opening 146 and an air injection threaded port 148 which permits injected air to enter the aftermix chamber 29.

The valve rod 138 longitudinally extends through the reservoir 110 and is slidably received in interference fit within the longitudinal bore 116 of the core 114. The valve rod 138 extends through the central hole 144 of the O-ring retainer 140 and slidably seals with the inner spacer O-ring 134 and the O-ring spacer 132. The valve rod 138 is suitably constructed with a connecting head 150 at one end to releasably engage a receiving socket 79 of the piston rod 78, as shown in FIG. 7.

Referring to FIG. 4, the cartridge assembly 42 includes a pair of apertures 152, 154 extending radially therethrough in communication between the exterior of the cartridge body 56 and the longitudinal bore 116 of the core 114. Inserted within each of the apertures 152, 154 is an inlet member 156, 158 of stainless steel or other such suitable material as noted above. Each inlet member 156, 158 has an inlet opening 160, 162 respectively, in communication with the longitudinal bore 116.

The inlet openings 160, 162 provide for the entry of components A and B into the longitudinal bore 116 of the mixing chamber 28 to form the polyurethane foam therein. As disclosed in U.S. Pat. No. 4,568,003 the inlet openings 160, 162 are arranged with respect to one another to provide optimum mixing of components A and B within the longitudinal bore 116 while at the same time avoiding the condition referred to as "cross-over". Cross-over occurs, for example, when component A entering through inlet opening 160 crosses over the longitudinal bore 116 and interacts chemically with component B entering through the inlet opening 162 to form the polyurethane or polyisocyanurate foam at the mouth of the inlet opening 162 in a manner to cause foam to accumulate at the inlet opening 162. The accumulation of polyurethane foam at one of the inlet openings 160, 162 prevents the flow of the component A or B into the mix chamber 28. Once this occurs, the cartridge assembly 42 must be removed from the dispensing gun 22 to clean or replace the cartridge assembly 42 prior to continued operation of the foam dispensing gun 22.

In the preferred embodiment as shown in FIG. 4, the inlet openings 160, 162 are radially spaced from each other at an angle of about 120 degrees so as to maximize the mixing efficiency between components A and B and to minimize the occurrence of cross-over. Referring to FIGS. 2, 3 and 4, the cartridge assembly 42 is shown removably secured to the carrier body 52 by the engagement of the nut 58 with the threaded rod 60. Prior to removing the cartridge assembly 42, the threaded fastener 50 is loosened to allow the receiving socket 79 of the piston rod 78 to disengage the connecting head 150 of the valve rod 138. Alternatively, by inverting the receiving socket 79 of the piston rod 78, the cartridge assembly 42 can be removed without the necessity of loosening the threaded fastener 50.

As shown in FIG. 4, the cartridge body 56 is arranged such that the apertures 152, 154 in the cartridge body 56 are in communication with fluid passageways 164, 166 formed in the carrier body 52. The fluid passageways 164, 166 intersect with longitudinal passageways 168, 170 which extend to a rear face 172 (see FIG. 1) of the carrier assembly 38.

Referring now to FIG. 5, a pair of valve bores 174, 176 intersect with the longitudinal passageways 168, 170 respectively. A control valve 178 for component A and a control valve 180 for component B are inserted in valve bores 174, 176 respectively. Hoses 26, 27 are threadably connected to longitudinal passageways 168, 170 respectively, at the rear face 172 of the carrier assembly 38. As shown in FIG. 4, O-rings 182, 184 are recessed in the carrier body 52 surrounding the two fluid passageways 164, 166. The O-rings 182, 184 provide a seal between the fluid passageways 164, 166 of the carrier body 52 and the inlet members 156, 158 of the cartridge assembly 42. Thus, components A and B are supplied to the mixing chamber 28 from the pressurized vessels 24 via the hoses 26, 27 to the carrier assembly 38 through the control valves 178, 180 and then through the inlet members 156, 158 into the longitudinal bore 116.

Referring now to FIGS. 2 and 3, the gas injection assembly 44 will now be explained. The gas injection assembly 44 branches off of the pipe tee 44. The gas injection assembly 44 includes an on/off valve 186 connected to a piping elbow 188. A regulating valve 190, such as a needle valve, for controlling the amount of gas flow through the gas injection assembly 44 is connected to the piping elbow 188. Tubing 192 directs the flow of air from the regulating valve 190 to the aftermix chamber 29. A tubing elbow 194 is attached to the end of the tubing 192 and threadably engages the air injection threaded port 148 of the cartridge assembly 42.

Figure 8:
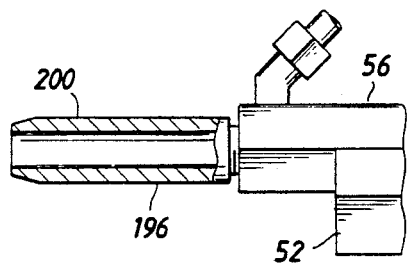
FIG. 8 is a cross-sectional view of a pour nozzle for the foam dispensing gun.

A nozzle 196 threadably engages the threaded opening 46 of the aftermix chamber 29. The shape of the nozzle 196 determines the pattern of the dispensed foam. The nozzle 196, as shown in FIGS. 2 and 3, is a spray nozzle 198 which is utilized to apply foam in a spraying operation. The nozzle 196, as shown in FIG. 8, is a pour nozzle 200 used to dispense the foam in a pouring operation.

The operation of the foam dispensing system 20, as shown generally in FIG. 1, will now be described. Referring to FIG. 1, the vessels 24 containing components A and B are pressurized by the pressure source 32, typically a tank of pressurized nitrogen, and the regulating valves 25. The components A and B are pressurized to approximately 100-250 pounds per square inch as compared to prior foam dispensing guns requiring the components A and B to be pressurized to approximately 800-1200 pounds per square inch. Alternatively, the source 32 may consist of a pump assembly (not shown) which pumps components A and B from the vessels 24 to the foam dispensing gun 22. The hoses 26, 27 from the component vessels 24 are connected to the carrier assembly 38 of the foam dispensing gun 32. The hoses 26, 27 may be either heated or unheated. The supply hose 30 connects the pressure source 32 with the pipe tee 34 of the foam dispensing gun 22. A regulating valve 33 controls the supply of compressed air or other gas from the source 32 to the dispensing gun 22. The compressed air supplied to the dispensing gun 22 is pressurized to approximately 100-250 pounds per square inch. It should be noted that the source 32 for the supply hose 30 may comprise a separate air compressor unit (not shown) to provide a more economical foam dispensing system 20.

The components A and B respectively fill the hoses 26 and 27 and the longitudinal passageways 168, 170 to the control valves 178 and 180. By opening the control valves 178, 180, the components A and B fill the remainder of the longitudinal passageways 168, 170 and the fluid passageways 164, 166 to the inlet openings 160, 162. Thus, a continuous supply of components A and B are supplied to the longitudinal bore 116 of the mixing chamber 28.

The pressurized gas from the pressure source 32 enters the air supply passageway 98 in the handle body 46 via the supply hose 30 and pipe tee 34. In the inoperative position, as shown in FIG. 3, the air supply passageway 98 communicates with the right compartment 108 formed by the trigger 88 and the trigger bore 86. The pressurized gas flows from the right compartment 108 through the first passageway 92 where it enters the rear of the cylinder bore 66. The trigger 88 is normally maintained in an outwardly extended position by the bias spring 89 inserted within the trigger bore 86. As shown in FIG. 3, the foam dispensing gun 22 is in an inoperative position when the trigger 88 is in an outward position and the pressurized gas enters the rear of the cylinder bore 66 which slides the piston 64 to its forward position. The forward section of the cylinder bore 66 to the left of the sliding piston 64 is maintained at substantially atmospheric pressure via the second passageway 94 and its communication to the external atmosphere via the trigger bore 86 and the channel 90.

The movement of the sliding piston 64 to the forward end of the cylinder bore 66, as shown in FIG. 3, causes the valve rod 138 to assume a closed position in the mixing chamber 28 such that the forward end of the valve rod 138 extends past the inlet openings 160, 162 in the core 114 of the cartridge assembly 42. In the closed position, the valve rod 138 prevents the flow of fluid components A or B into the longitudinal bore 116 of the mixing chamber 28 from the inlet openings 160, 162.

The on/off valve 186 of the air injection assembly 44 is opened to permit pressurized gas or air to flow to the regulating valve 190. The regulating valve 190 is adjusted to allow the proper amount of gas or air to flow into the aftermix chamber 29. The injected air into the aftermix chamber serves to more completely mix the components A and B and also serves to dispense a high quality spray pattern of foam through the spray nozzle 198. The regulating valve 190 is used to adjust the "fineness" of the spray pattern.

In order to activate the foam dispensing gun 22 for pouring or spraying, the control valves 178, 180 (see FIG. 5) are open and the trigger 88 is pressed inward as shown in FIG. 2. Pressing the trigger 88 inward causes the pressurized gas in the air supply passageway 98 to flow through the right compartment 108 and into the second passageway 94. The pressurized gas fills the passageway 94 and enters the front end of the cylinder bore 66 forcing the sliding piston 64 to its rearward position adjacent the back plate 72. As the sliding piston 64 moves to its rearward position, the air to the right of the piston 64 is forced out of the cylinder bore 66 through the first passageway 92. The first passageway 92 communicates with the left compartment 106 which is in communication with the channel 90 which is open to the atmosphere.

As the sliding piston 64 moves to its rearward position, the valve rod 138 is retracted by the piston rod 78. The forward end of the retracted valve rod 138 exposes the inlet openings 160, 162 in the longitudinal bore 116 of the core 114, thereby allowing the components A and B to flow into the mix chamber 28. When components A and B flow into the mix chamber 28, they mix together and are forced out of the mix chamber 28 into the aftermix chamber 29 as a result of being under pressure. With the on/off valve 186 open and the regulating valve 190 adjusted to allow the desired amount of pressurized air to flow into the aftermix chamber 29, continued mixing of components A and B occurs in the aftermix chamber 29. Furthermore, the injected pressurized air into the aftermix chamber 29 forces the mixed foam out of the aftermix chamber 29 and through the nozzle 196.

The forward end of the valve rod 138 remains in the longitudinal bore 116 of the core 114 while in the retracted position. This serves to maintain the valve rod 138 in proper alignment with the longitudinal bore 116 and also serves to seal off the mix chamber 28 from the reservoir 110. The reservoir 110 is filled with silicone which lubricates that portion of the valve rod 138 which enters the reservoir 110.

When it is desired to stop the dispensing of foam, the trigger 88 is released which directs pressurized gas into the rear of the cylinder bore 66 forcing the sliding piston 64 to move to its forward position. The forward movement of the piston 64 causes the valve rod 138 to move to its forward position, thus, closing off the inlet openings 160, 162 as shown in FIG. 3. The forward end of the valve rod 138 cleans the longitudinal bore 116 of the core 114 of substantially all foam components or foam remaining in the mix chamber 28. The injected air from the air injection assembly 44 removes and cleans substantially all remaining foam from the forward end of the valve rod 138, the aftermix chamber 29 and the nozzle 196. The on/off valve 186 can be closed once the trigger 88 has been released and the mix chamber 28, the aftermix chamber 29 and the nozzle 196 has been cleaned.

The description given herein is intended to illustrate the preferred embodiment of the present invention. It is possible for one skilled in the art to make various changes in the details of the apparatus and system without departing from the spirit of this invention. Therefore, it is intended that all such variations be included within the scope of the present invention as claimed.

We claim:

1. A foam dispensing apparatus for mixing a plurality of foam components into an expanded foam and dispensing the mixed foam components, comprising:
   a body portion;
   a cartridge assembly mounted on said body portion, said cartridge assembly including a mix chamber having a bore and an aftermix chamber in communication with said mix chamber;
   mean for supplying the plurality of foam components to said bore of said mix chamber;
   means for controlling the flow of the plurality of foam components into said mix chamber; and
   means for injecting a pressurized gas into said aftermix chamber during the flow of the plurality of foam components into said mix chamber to aid in the mixing of the plurality of foam components.

2. The apparatus according to claim 1, wherein said body portion comprises:
   a handle assembly; and
   a carrier assembly mounted on said handle assembly, said cartridge assembly being removably mounted on said carrier assembly.

3. The apparatus according to claim 2, wherein said means for supplying comprises:
   a plurality of inlets in said cartridge assembly through which the plurality of foam components enter said mix chamber; and
   a plurality of fluid passageways in said carrier assembly which are in communication with said plurality of inlets; said plurality of fluid passageways adapted to receive the plurality of foam components.

4. The apparatus according to claim 2, wherein said bore is a longitudinal bore and wherein said means for controlling the flow comprises:
   a valve rod which slides in said longitudinal bore of said mix chamber; and
   means for moving said valve rod between an operative position in which said valve rod permits the plurality of foam components to enter said mix chamber and an inoperative position in which said valve rod prohibits the plurality of foam components from entering said mix chamber.

5. The apparatus according to claim 4, further comprising:
   a nozzle removably connected to said aftermix chamber through which the mixed foam is dispensed from the foam dispensing apparatus.

6. The apparatus according to claim 5, wherein said valve rod cleans and removes substantially all of the plurality of foam components and mixed foam remaining in said longitudinal bore of said mix chamber during the transition from the operative to inoperative position and the injected pressurized gas in said aftermix chamber cleans and removes substantially all of the plurality of foam components and mixed foam from said aftermix chamber and said nozzle.

7. The apparatus according to claim 1, wherein said means for injecting a pressurized gas into said aftermix chamber comprises:
   an injection port in said aftermix chamber in communication with a source of pressurized gas.

8. A foam dispensing apparatus for mixing a plurality of foam components into an expanded foam and dispensing the mixed foam components, comprising:
   a body portion having a handle assembly and a carrier assembly mounted on said handle assembly;
   a cartridge assembly including a mix chamber having a longitudinal bore and an aftermix chamber in communication with said mix chamber;
   means for supplying the plurality of foam components to said longitudinal bore of said mix chamber, wherein said means for supplying includes a plurality of inlets in said cartridge assembly through which the plurality of foam components enter said mix chamber and a plurality of fluid passageways in said carrier assembly which are in communication with said plurality of inlets, said plurality of fluid passageways adapted to receive the plurality of foam components;

means for controlling the flow of the plurality of foam components into said mix chamber, wherein said means for controlling includes a valve rod which slides in said longitudinal bore of said mix chamber and means for moving said valve rod between an operative position in which said valve rod permits the plurality of foam components to enter said mix chamber and an inoperative position in which said valve rod prohibits the plurality of foam components form entering said mix chamber; and means for injecting a pressurized gas into said aftermix chamber during the flow of the plurality of foam components into said mix chamber to aid in the mixing of the plurality of foam components and to provide an improved spray pattern of foam, wherein said means for injecting includes an injection port in said aftermix chamber in communication with a source of pressurized gas.

9. The apparatus according to claim 8, further comprising:

a nozzle removably connected to said aftermix chamber through which the mixed foam is dispensed from the foam dispensing apparatus.

10. The apparatus according to claim 9, wherein said valve rod cleans and removes substantially all of the plurality of foam components and mixed foam remaining in said longitudinal bore of said mix chamber during the transition from the operative to inoperative position and the injected pressurized gas in said aftermix chamber cleans and removes substantially all of the plurality of foam components and mixed foam from said aftermix chamber and said nozzle.

11. A method of mixing a plurality of foam components into a foam and dispensing a foam spray from a foam dispensing apparatus, each of the plurality of foam components being pressurized, comprising the steps of:

introducing each of the plurality of foam components into a mix chamber of the foam dispensing apparatus;

mixing the plurality of foam components in the mix chamber to form a foam;

introducing pressurized gas at a location downstream of the introduction of the foam components into the mix chamber and while the foam components are introduced into the mix chamber to provide additional mixing of the foam; and dispensing a foam spray from the foam dispensing apparatus.

12. The method according to claim 11, further comprising the step of:

regulating the amount of introduced pressurized gas to control the quality of the foam spray.

* * * * *